(12) United States Patent
Schmidt

(10) Patent No.: US 11,714,662 B2
(45) Date of Patent: Aug. 1, 2023

(54) TECHNIQUE FOR REPORTING NESTED LINKING AMONG APPLICATIONS IN MAINFRAME COMPUTING ENVIRONMENT

(71) Applicant: BMC Software, Inc., Houston, TX (US)

(72) Inventor: John Schmidt, White Lake, MI (US)

(73) Assignee: BMC Software, Inc., Houston, TX (US)

( * ) Notice: Subject to any disclaimer, the term of this patent is extended or adjusted under 35 U.S.C. 154(b) by 204 days.

(21) Appl. No.: 17/241,568

(22) Filed: Apr. 27, 2021

(65) Prior Publication Data

US 2022/0342678 A1    Oct. 27, 2022

(51) Int. Cl.
*G06F 9/445* (2018.01)
*G06F 9/54* (2006.01)

(52) U.S. Cl.
CPC .......... *G06F 9/44521* (2013.01); *G06F 9/547* (2013.01)

(58) Field of Classification Search
None
See application file for complete search history.

(56) References Cited

U.S. PATENT DOCUMENTS

| 2014/0207871 A1* | 7/2014 | Miloushev | G06F 9/5072 709/205 |
| 2019/0235999 A1* | 8/2019 | Everitt | G06F 11/362 |
| 2022/0035740 A1* | 2/2022 | Di Gregorio | G06F 1/3287 |

* cited by examiner

*Primary Examiner* — Umut Onat
(74) *Attorney, Agent, or Firm* — Brake Hughes Bellermann LLP

(57) ABSTRACT

A computer-implemented method is presented for reporting application programs linked to by an application running under an online transaction processor of a mainframe computing environment. An intercept program is implanted in an address space of the online transaction processor. A task executing outside of the address space of the online transaction processor identifies an address for a target domain gate program supported in a domain by the online transaction processor; identifies an address for an unused domain gate program supported in the domain by the online transaction processor; replaces the address for the unused domain gate program with the address for the target domain gate program; and replaces the address for the target domain gate program with an address for the intercept program.

20 Claims, 11 Drawing Sheets

US 11,714,662 B2

TECHNIQUE FOR REPORTING NESTED LINKING AMONG APPLICATIONS IN MAINFRAME COMPUTING ENVIRONMENT

FIELD

The present disclosure relates to a technique for reporting nested linking among application programs by an online transaction processor in a mainframe computing environment.

BACKGROUND

The IBM Customer Information Control System (CICS)® is a collection of programs that allows end users to run programs and applications that manage their businesses, and follows the transactional model of larger server computers allowing for interactive applications where work is divided into individual operations called transactions. The CICS collection of programs are an online transaction processor. When a transaction begins execution, a program is run by CICS that is associated with the transaction which can then transfer control to other programs over the life of the transaction. Thus, it's possible to create modular applications comprised of numerous CICS application programs. In a CICS system (or region thereof) there can be numerous transactions running. A single instance of one such transaction is called a task. These CICS tasks are an entity created, dispatched, and deleted by CICS system programs known only to CICS, but are dispatched for execution by an operating system of the mainframe computer.

Application programs that execute in CICS regions are often written to carry out specific functions or subset of functions of a business application, such as add an employee record, update it, delete it, create a paycheck, etc., which can be broken down into multiple programs by function(s). They could also be modularized by resources accessed, such as Db2 databases or files. When an application wants to transfer control to another application there are several means available, including the standard CALL statement available in high-level languages, such as COBOL or PL/1, as well as the CICS application program interface commands, such as LINK, XCTL (transfer control), and INVOKE APPLICATION.

One drawback to writing modular applications comprised of numerous programs is that a change to one program can adversely affect the response time or performance of a single transaction. When determining where a performance slowdown occurs in a CICS region, the CICS monitoring data (e.g., in the PERFORMANCE class DFHPROG group) is missing data about linked or called application programs because the CICS monitoring data records only the initial application program that is defined by the transaction as it is dispatched by the CICS dispatcher domain.

This background section provides background information related to the present disclosure that is not necessarily prior art.

SUMMARY

This section provides a general summary of the disclosure and is not a comprehensive disclosure of its full scope or all of its features.

In one aspect, a computer-implemented method is presented for reporting application programs linked to by an application running under an online transaction processor of a mainframe computing environment. The method includes an intercept program that determines a program name for a target application linked to by the application and saves the program name in a memory space accessible by tasks running in the online transaction processor's address space by: (1) an intercept program outside of the online transaction processor's address space is copied by a first program, which is executing in the same address space in which the intercept program is located, to the online transaction processor's address space; (2) a second program, which is executing in the same address space as the first program, identifies addresses of a target domain gate and its domain gate program that are located in the online transaction processor's address space; (3) the second program locates an unused domain gate and its domain gate program that are located in the online transaction processor's address space; and (4) in the online transaction processor's address space, (a) the first program replaces the address for the unused domain gate program with the address for the target domain gate program and (b) the first program replaces the address for the target domain gate program with the address for the intercept program.

In another aspect, a different computer-implemented method is presented for reporting application programs linked to by an application running under an online transaction processor of a mainframe computing environment, where the application is written in accordance with a given programming language. The method includes: (1) an intercept program outside of the online transaction processor's address space is copied by a first program, which is executing in the same address space in which the intercept program is located, to the online transaction processor's address space; (2) a second program, which is executing in the same address space as the first program, identifies addresses of a library vector and a library routine that are located in the online transaction processor's address space; and (3) in the online transaction processor's address space, (a) the first program inserts the address for the library routine into the intercept program; and (b) the first program replaces the address for the library routine in the library vector with the address for the intercept program.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
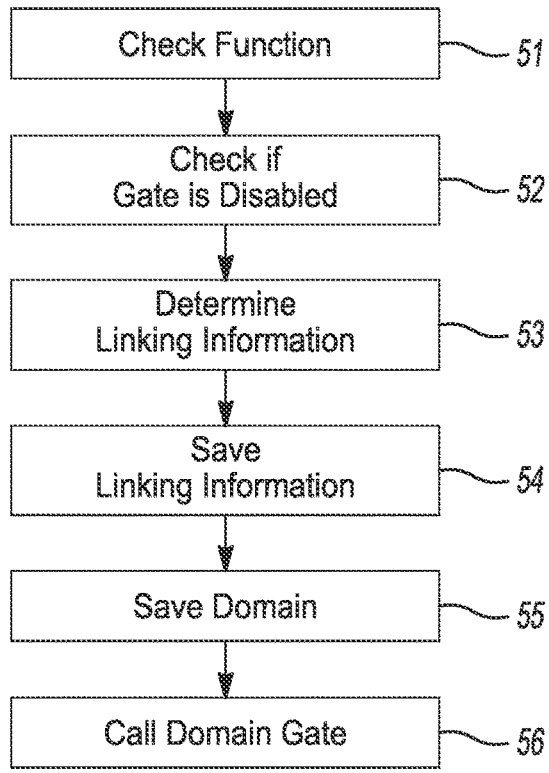
Figure 6:
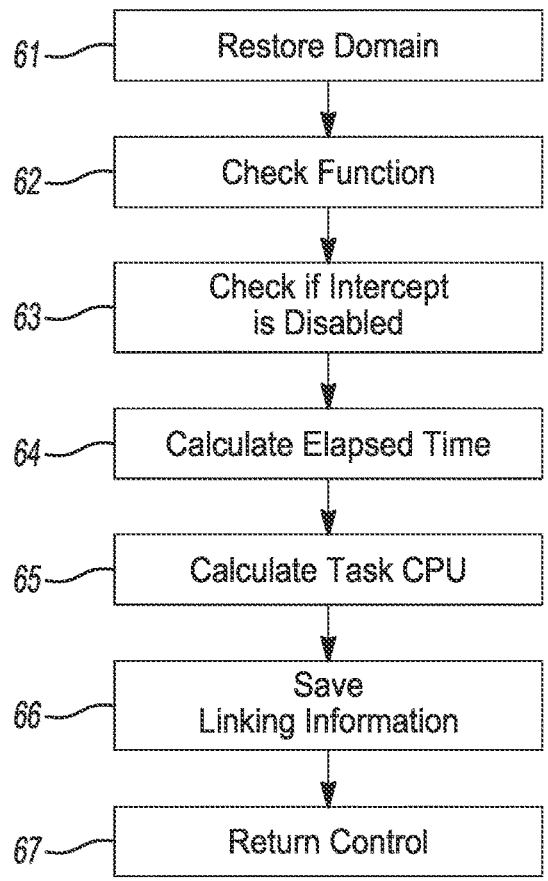
Figure 7A:
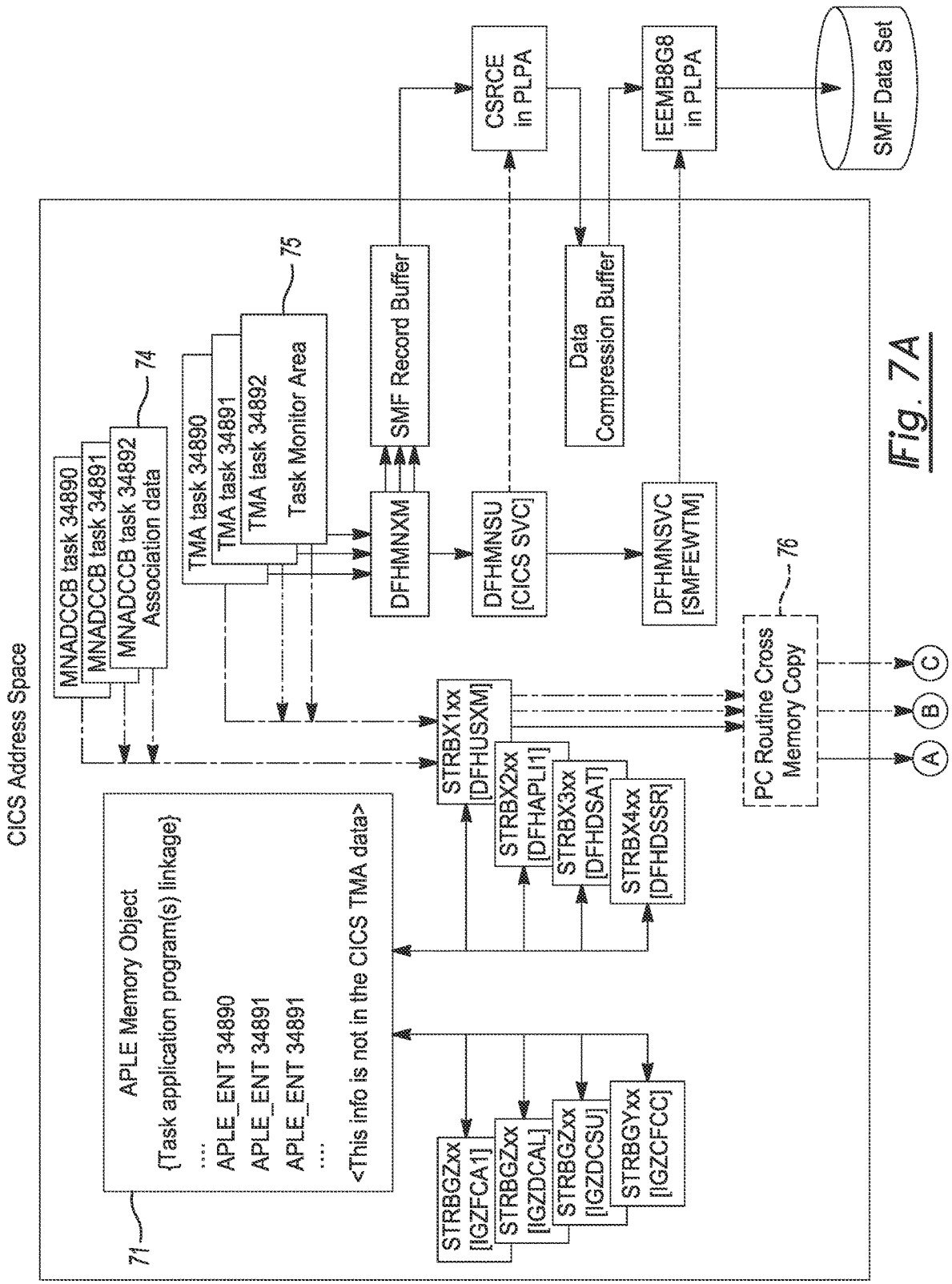
Figure 7B:
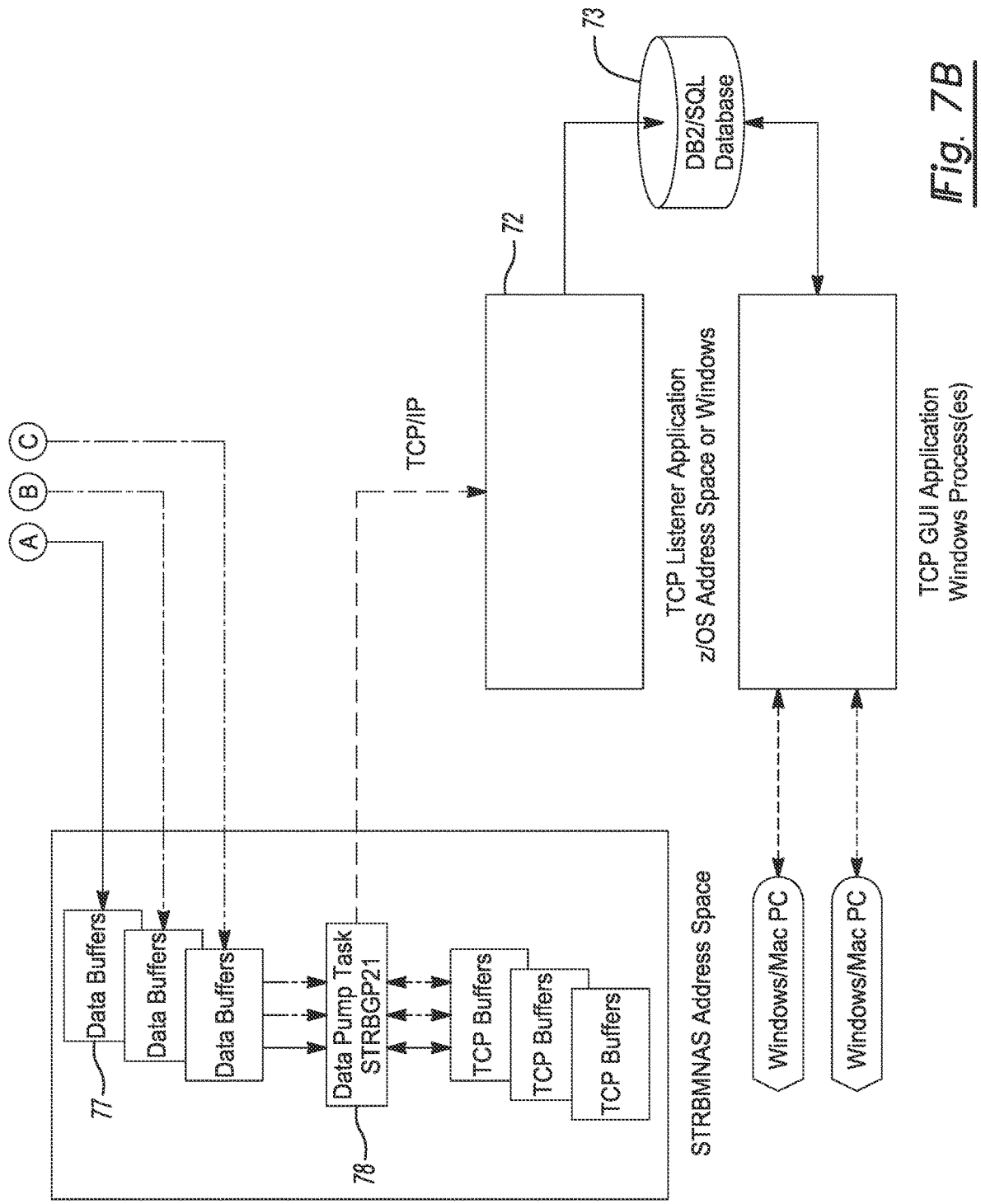
Figure 8:
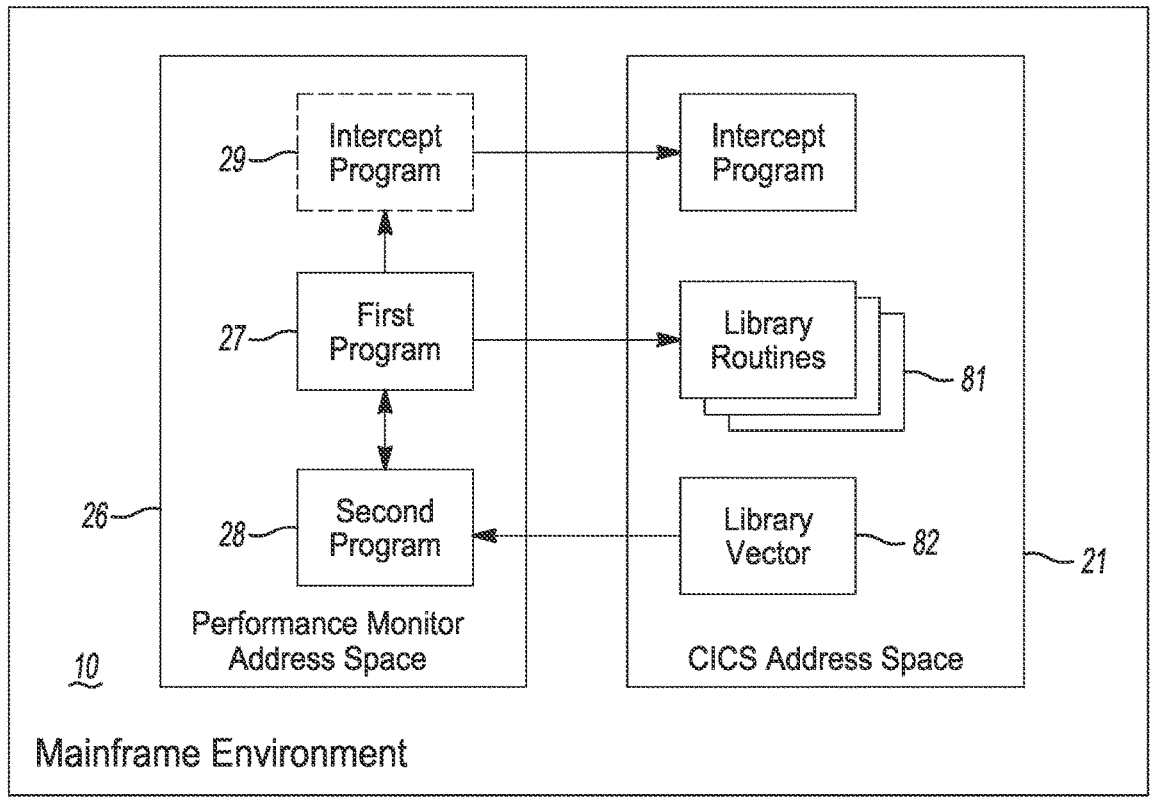
Figure 9:
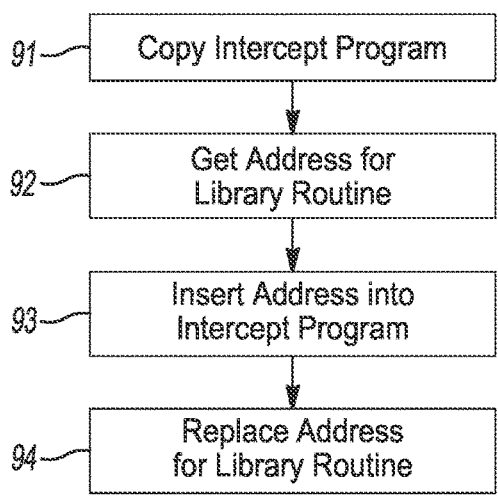
Figure 10:
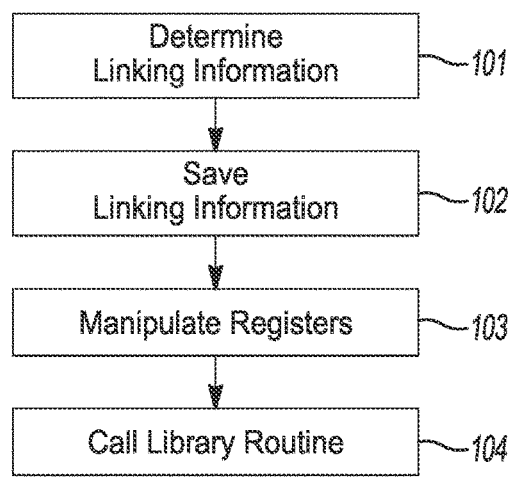
Figure 11:
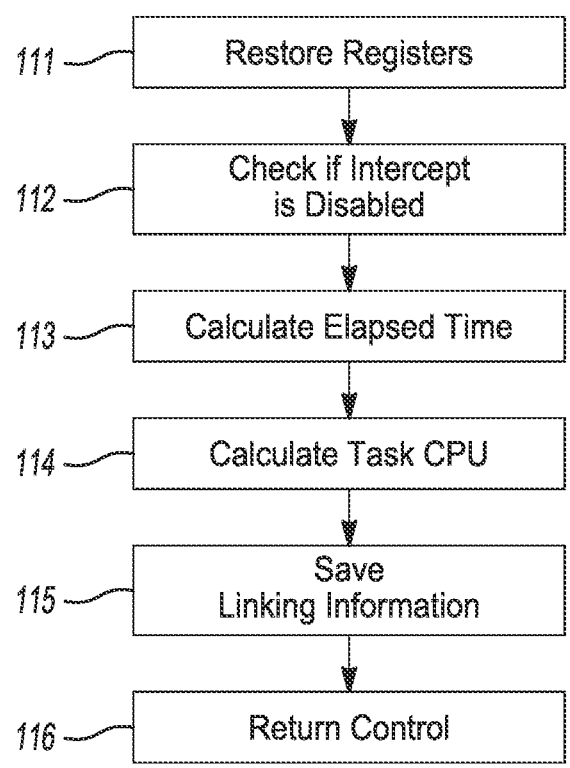

FIGS. 4A-4D taken as a whole is a diagram illustrating an implanted intercept program in a hosting domain gate;

FIG. 5 is a flowchart depicting an example processing of an intercept program upon entry to a domain gate;

FIG. 6 is a flowchart depicting an example processing of an intercept program upon exiting a domain gate;

FIGS. 7A and 7B taken as a whole is a diagram illustrating an example technique for extracting linking information from the CICS address space;

FIG. 8 is diagram showing a portion of a mainframe computing environment;

FIG. 9 is a flowchart depicting an example technique for reporting dynamic calls made by COBOL programs running under CICS;

FIG. 10 is a flowchart depicting example processing of an intercept program called when a dynamic call is made by COBOL application; and FIG. 11 is a flowchart depicting an example processing of an intercept program when control is returned from COBOL application.

Corresponding reference numerals indicate corresponding parts throughout the several views of the drawings.

DETAILED DESCRIPTION

Example embodiments will now be described more fully with reference to the accompanying drawings.

At the highest level, CICS is organized into domains. Each domain is an individual major component of CICS. Each domain is represented by programs and data. Domains never communicate directly but communicate through CICS kernel linkage routines.

Each domain manages its own data using programs specific to its domain, and no domain can access data of another domain directly. If a domain needs data or functions provided by another domain, it must call that domain using a specific parameter list and that domain then carries out the function passing any data back to the calling domain.

Communication to a domain is done through domain gates, an entry point (program) or published interface. Domains typically have several domain gates. Each active domain gate has an index number associating it with a specific program. Each domain gate also has a four character identifier, where the first two characters identify the owning domain and the second two characters differentiate the functions of the domain's gates. While techniques for reporting nested linking among application programs in CICS are described in this disclosure, it is readily understood that these techniques can be extended to other online transaction processors executing in a mainframe computing environment.

Figure 1:
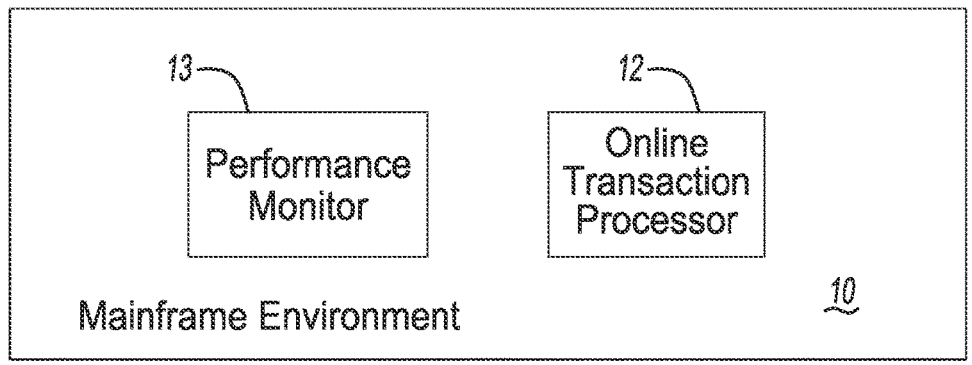
FIG. 1 is diagram showing a mainframe computing environment with an online transaction processor and a performance monitor.

FIG. 1 depicts a mainframe computing environment 10 with an online transaction processor 12 and a performance monitor 13. In the example embodiment, the online transaction processor 12 is CICS. The BMC Compuware Strobe application is one example of a performance monitor 13 for a mainframe environment. It is envisioned that the techniques described in this disclosure can be extended to other types of performance monitors as well.

Figure 2:
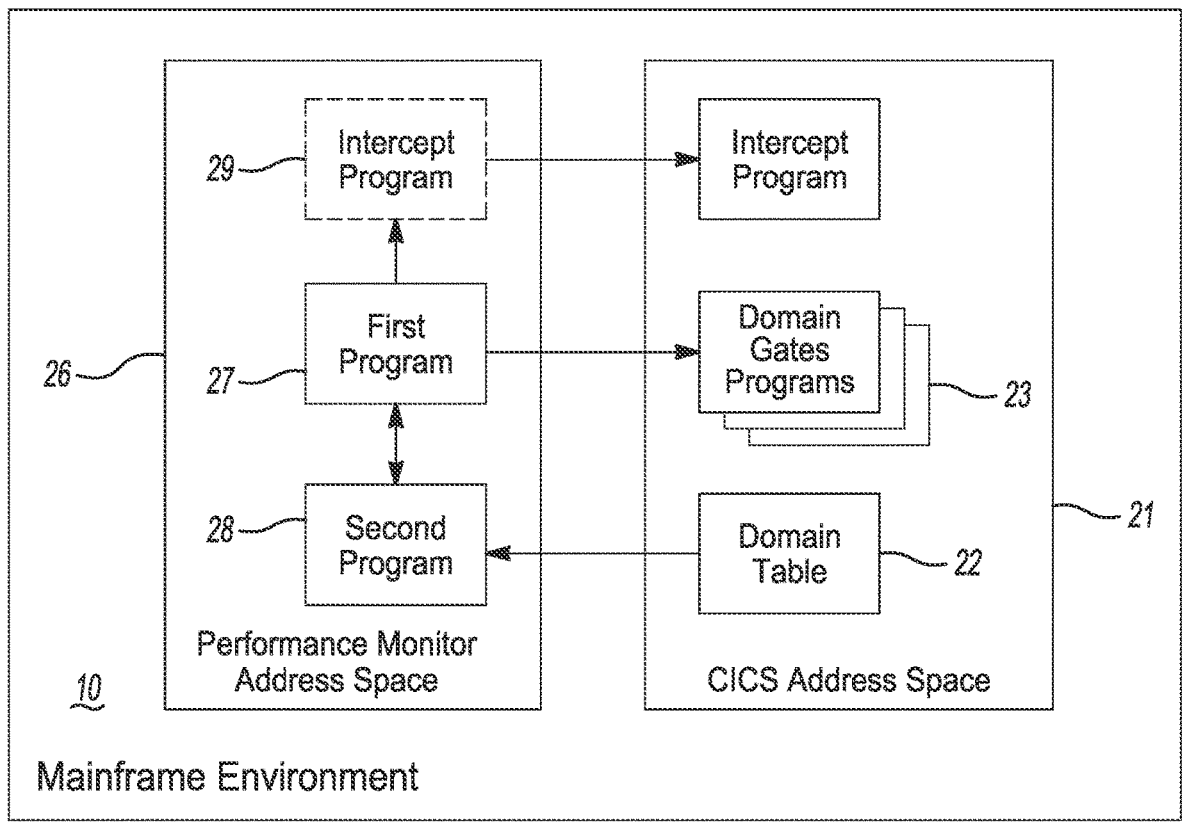
FIG. 2 is a diagram further illustrating an example embodiment of an online transaction processor and a performance monitor.

FIG. 2 further illustrates an example embodiment of the techniques described in this disclosure. In this example embodiment, an online transaction processor 12 is CICS. CICS is defined by its assigned address space 21, including the programs and data residing therein. More specifically, the CICS address space 21 includes a domain table 22 and domain gate programs 23. The domain table 22 contains addresses for the domain gate programs 23 supported in a CICS domain.

Similarly, the performance monitor 13 is defined by an assigned address space 26, including programs and data residing therein. In one embodiment, the address space 26 includes a first program 27, a second program 28 and an intercept program 29. The first program 27 and the second program 28 are running under a task executing in the address space 26, i.e., an address space outside of the CICS address space 21. As will be further described below, the intercept program 29 is configured to determine a program name for an application that is linked to by another application and to save the program name in a memory space accessible to tasks running in the CICS address space 21.

Figure 3:
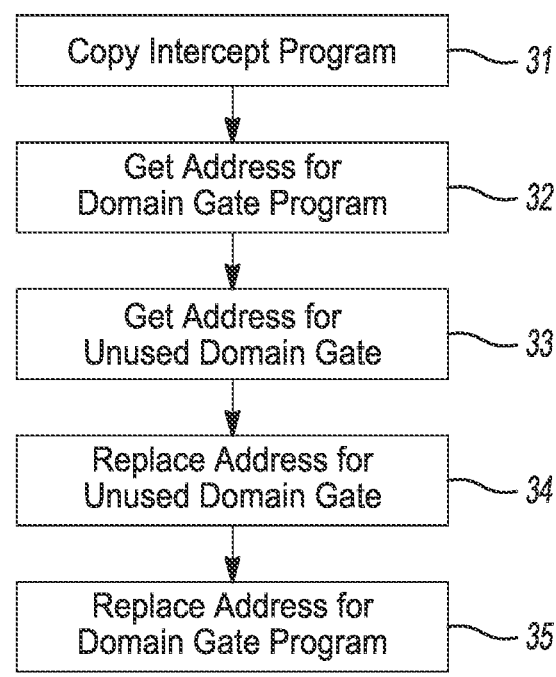
FIG. 3 is a flowchart depicting an example technique for reporting nested linking among application programs by an online transaction processor.
Figure 4A:
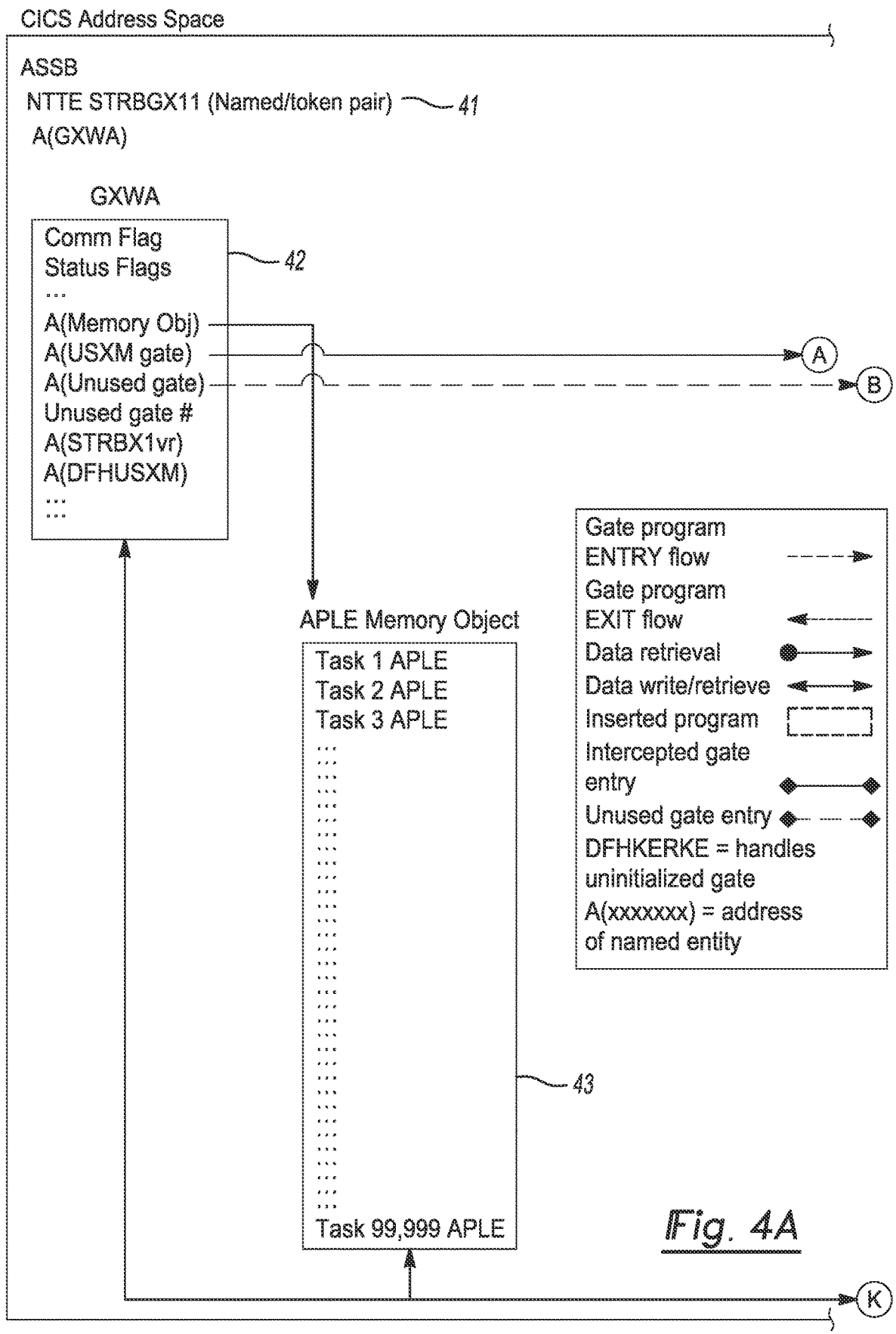
Figure 4B:
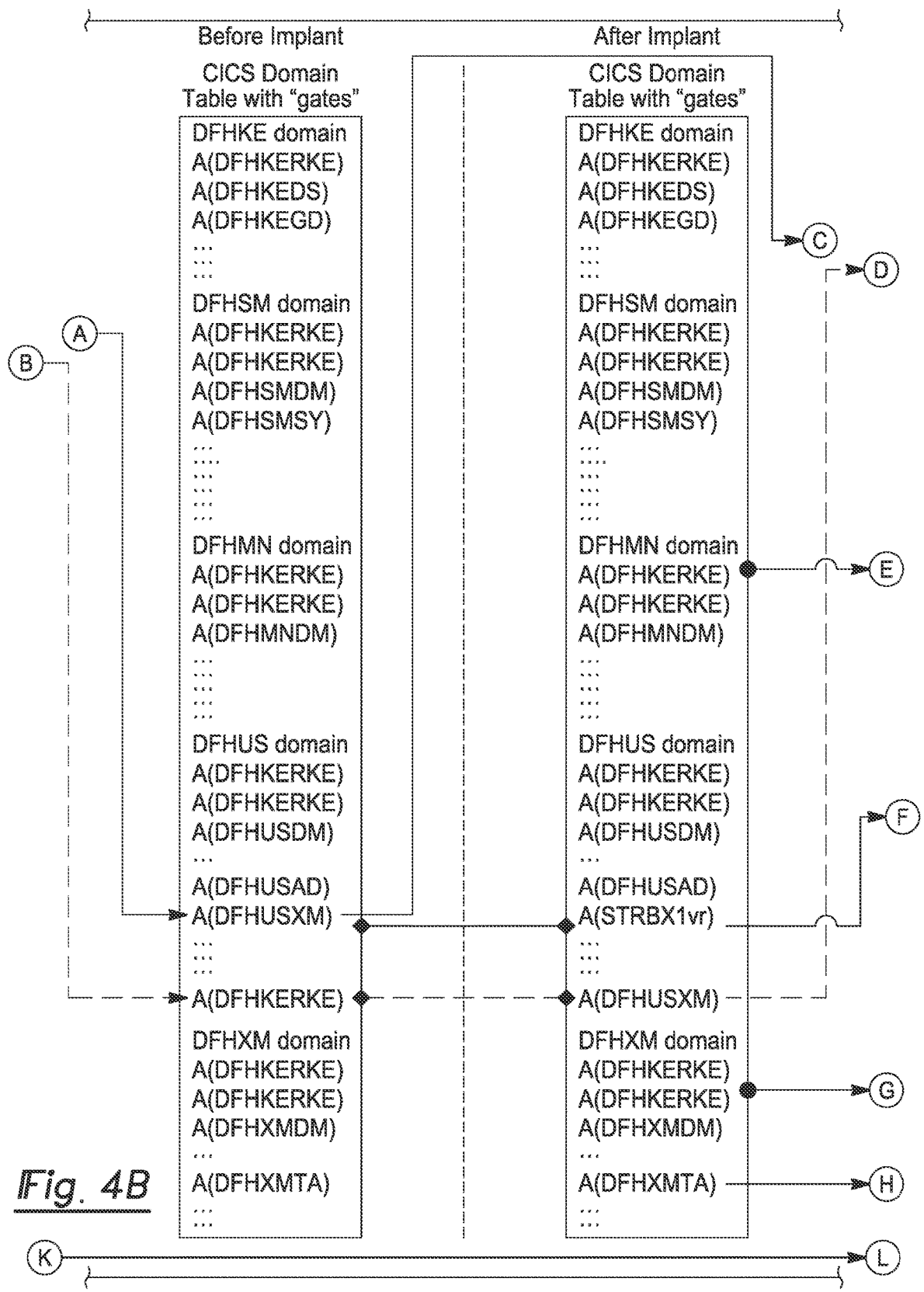
Figure 4C:
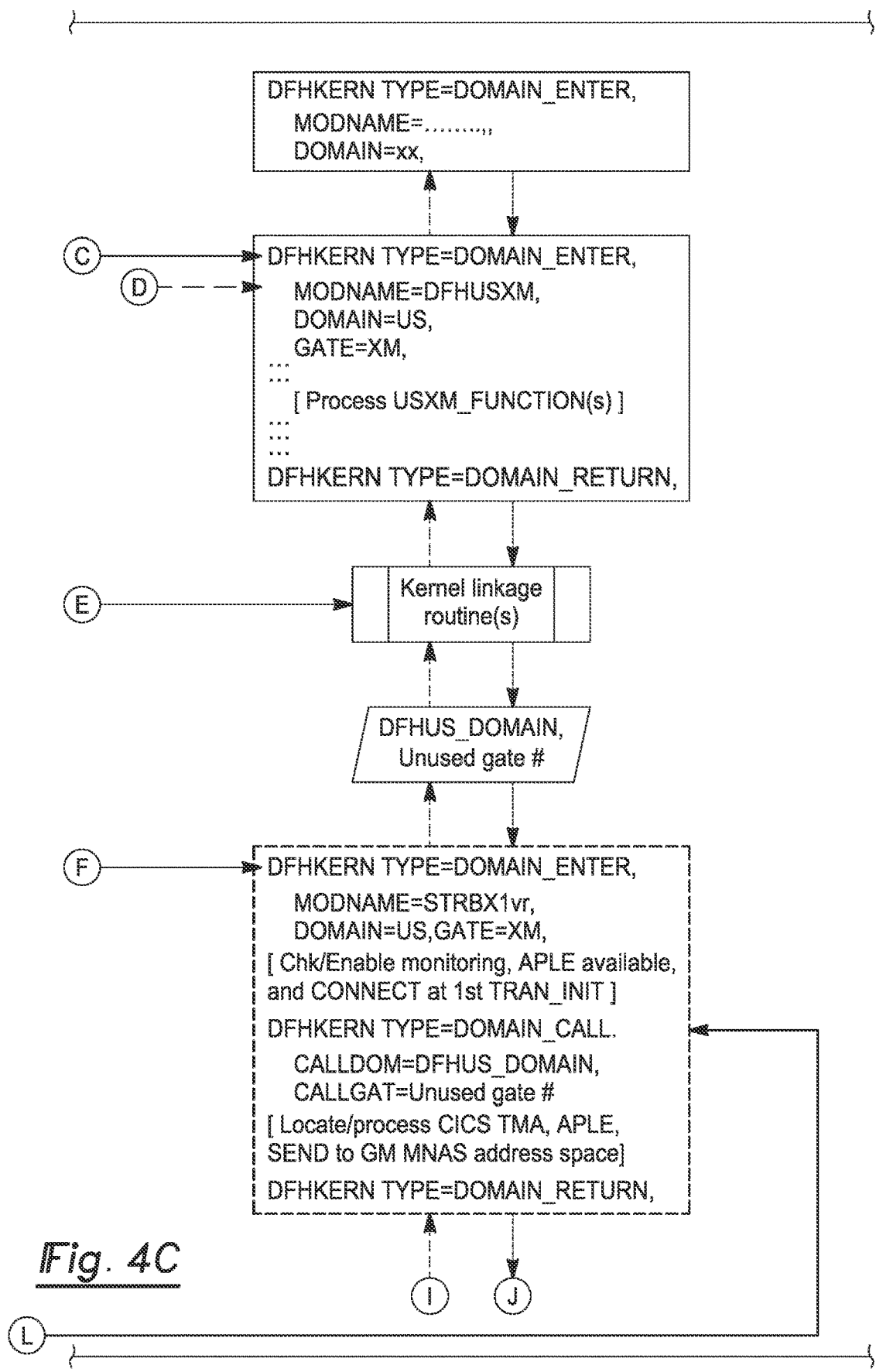
Figure 4D:
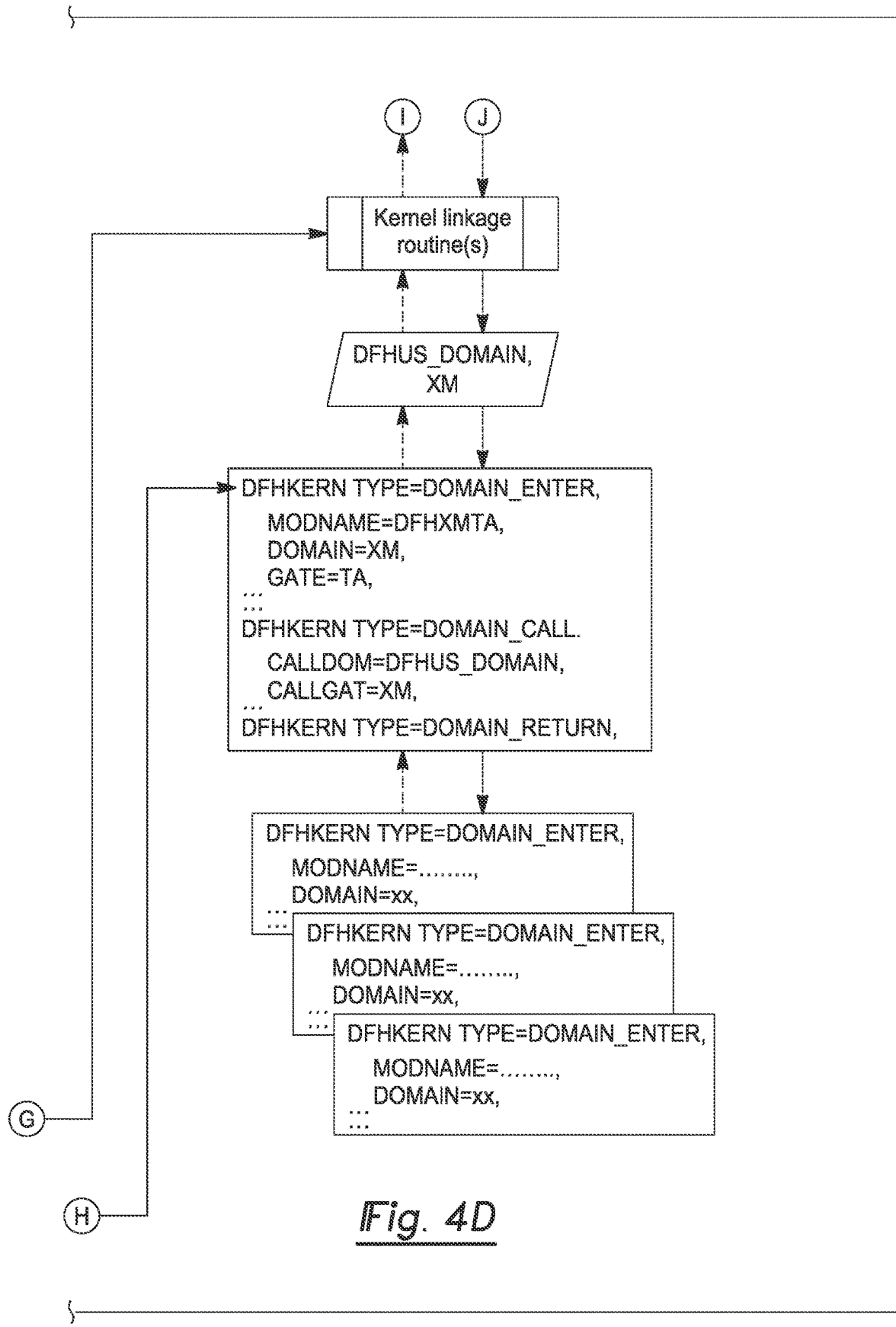

FIG. 3 depicts an example technique for reporting nested linking among application programs running under an online transaction processor in a mainframe computing environment. As a starting point, intercept program 29 is copied at 31 from performance monitor address space 26 into the CICS address space 21 by first program 27.

Different domain gates may be used to host an implanted or copied intercept program. A hosting domain gate program is preferably the domain gate program passed through before an application links to another application. Such domain gate program will include a function that passes control to a called application. Two possible domain gates of interest for capturing when CICS application programming interfaces (APIs), such as a LINK or XCTL API occurs are the PGLE domain gate and the PGXE domain gate. Both of these gates are in the program manager domain. One drawback of using these two gates is having to place a user written domain gate program at two gates in order to capture central processing unit (CPU) time and elapsed time of the called program.

In an example embodiment, an intercept program is swapped into one or more of four preferred domain gate programs: DFHUSXM gate; DFHDSAT gate, DFHDSSR gate, and DFHAPLI gate. This approach means capturing CPU consumption and elapsed time closer to an actual application program getting and releasing control and accurately calculating its CPU time. While swapping an intercept program into each of these four domain gate programs is preferred, an intercept program may be swapped into more than these four domain gate programs. It is also envisioned that an intercept program may be swapped into other domain gate programs as well. Because a domain gate program performs required functions, it cannot simply be replaced with an intercept program. Rather, a domain gate program must remain in the call sequence. Thus, steps are taken to move a replaced domain gate program from its original location to an unused domain gate by relocating the domain gate program's address.

With continued reference to FIG. 3, a second program 28 identifies an address for a domain gate program (e.g., DFHAPLI1) as indicated at 32. In an example embodiment, the second program retrieves addresses for a domain gate and its domain gate program from a domain table 22. The second program 28 also identifies at 33 an address for an unused domain gate program. An unused domain gate program can be located by searching the domain gate table 22 until an entry is found, for example with a prolog addressing DFHKERKE. This entry in turn provides an address for an unused domain gate and its domain gate program. In the example embodiment, a second program 28 is called by a first program 27, and the second program 28 passes the addresses back to the first program 27 using a control block allocated by the first program 27.

Next, the first program 27 replaces the address for the unused domain gate program in the domain table 22 with the address for a target domain gate program at 34. In this way, the target domain gate program is executed in the call sequence. The first program 27 then replaces the address for the target domain gate program in the domain table 22 with the address for the intercept program 29. As a result, the intercept program is executed before the target domain gate program. It is to be understood that only the relevant steps of the technique are discussed in relation to FIG. 3, but that other software-implemented instructions may be needed to control and manage overall operation of a system.

Further details related to implanting an intercept program 15 into a CICS address space 21 are described in relation to FIGS. 4A-4D. Prior to implanting an intercept program in the CICS address space, certain steps are performed from a performance monitor of mainframe environments, for example, the Strobe Global Monitor Address Space (MNAS). In an example embodiment, a named/token pair is first created at a first level to hold an address of a work area (such as the GXWA) as indicated at 41.

Second, a work area 42 is allocated for use by an intercept program in a CICS address space. The allocated work area 42 could contain information used by all user domain gate programs, such as an address of a control block that is mapped by a memory object, for example, an application link element (APLE) memory object; an address of a control block that the MNAS uses to maintain connections to other address spaces, for example, the Global Monitor Vector (GMVT), where the GMVT is required to send data to the MNAS in a mainframe environment; a target gate (index) number of a relocated (intercepted) CICS domain gate program, one for each implanted intercept program; a flag byte used to communicate with each intercept program by a MNAS control program; and status flags for intercept programs to communicate their states, such as error-disabled, connected, disconnected, and data pump counts number of records sent to the MNAS. The target gate (index) number of the relocated (intercepted) CICS domain gate program is determined during a CICS region/release identification process in the MNAS (i.e., the second program 28).

Third, a memory object 43 is allocated and owned by the CICS job step's task control block (TCB). The reason for this storage is to hold a table that will contain the following information when a CICS user application does any one of the following commands: LINK, XCTL, or INVOKE APPLICATION. The table is indexed by the CICS task number under which a LINK, XCTL, or INVOKE APPLICATION command occurs. Each table entry in an APLE memory object is 2,048 bytes, which includes the header (64 bytes) and 31 entries of 64 bytes for all nested programs called over the life of the task. An example data layout for each table entry is as follows:

```
Entry Header (APLE_APL_HDR):
    Task number (index into table)
    Transaction ID
    Number of START_PROGRAM || CALL captured for this task
Elements (APLE_APL_ENT):
    Program name (from DFHAPLI_ARG)
    Elapsed time (EXIT-ENTRY STCK time difference)
    Consumed CPU time (EXIT-ENTRY CPU difference)
    # of START_PROGRAM to Program name.
```

It is readily understood that the number of entries in the APLE table entry could increase or decrease depending on future requirements. Once these steps are completed, the implant process in the MNAS will replace any intercept after relocating the intercepted CICS domain gate program to a free/unused entry in the domain gate index.

In this example embodiment, an intercept program will gain control when a CICS gate program is called by other CICS programs and execute before calling the target domain gate program using the saved target gate index number from the GXWA. The CICS kernel linkage program for domain calls will allocate a CICS kernel stack using a stack size for the intercept program. This allows the intercept program to define its own dynamic (work) area with fields it requires.

Additionally, the intercept program will receive a parameter list defined by any CICS domain gate program and determine from a function within the parameter list if it needs to perform any work or simply pass the parameter list on to the CICS domain gate program being executed. No matter what the function is, or if the intercept program recovery routine gets control from any abend it may encounter, the real CICS domain gate program must always be called before an intercept program can return to its caller. An intercept program cannot modify a parameter list before calling a CICS domain gate program or upon return from a CICS domain gate program. If required, the intercept program then performs any additional processing upon return from the CICS domain gate program, before returning to its caller. An intercept program defines a recovery routine located within the intercept program to handle any abends encountered while processing. Minimally, it needs to set a bypass flag in a GXWA so that subsequent calls to a CICS domain gate program will just pass the call through to the CICS domain gate program.

If a performance monitor 13 is scheduled to terminate, it should disable all intercept programs by setting a bypass flag in a GXWA. It must not release the storage allocated to hold copied intercept programs or the GXWA even after restoring the CICS domain gate program's addresses at a target CICS domain gate. This is due to the multi-tasking nature of CICS such that an intercept program can reside on multiple CICS kernel stack entries at any point in CICS processing, or even multiple times on a single task's kernel stack. Once an intercept program is entered it remains on the task's kernel stack until it returns control to its caller through CICS's kernel linkage program, and its stack entry is deleted from the task kernel stack. When a performance monitor restarts, the named/token pair is used to locate a GXWA and intercept program(s)' addresses to once again update the CICS domain gate program's gate entry and enable the intercept programs. These storage areas will be allocated as assigned to the CICS job step's TCB address and will be automatically released when the CICS region is terminated.

During execution of an application running under CICS, domain gate programs are called and intercept programs are executed before and after a CICS domain gate program. FIG. 5 provides an overview of the functionality implemented by an intercept program upon entry to a domain gate hosting an intercept program, for example upon entry to the DFHAPLI domain gate.

An intercept program begins by checking a function set for a domain gate program as indicated at 51. In the example of an DFHAPLI domain gate, the intercept program confirms the function is set to a function code for example APLI_START_PROGRAM. If so, processing continues; otherwise, the entry logic of an intercept program is bypassed. Similarly, an intercept program checks at 52 whether or not the domain gate is or has been disabled by a performance monitor 13. If the domain gate is enabled, processing continues; otherwise, entry logic of the intercept program is bypassed. It is readily understood that other types of checks may be performed by the intercept program depending upon the function of a CICS domain gate.

Next, an intercept program determines linking information that can be used to report the linking of a calling application to a called application as indicated at step 53. For example, if not already captured by the DFHUSXM gate's intercept program, the DFHAPLI intercept program will retrieve a transaction identifier for the task associated with the execution of the calling application and its CICS task number from a control block managed by CICS. In the example embodiment, this linking information is retrieved from the CICS task control block. In addition, the program name for the application program being linked to or called by the calling application is also retrieved by the DFHAPLI intercept program, for example from the DFHAPLI's program parameter list. In this way, the intercept program can report on nested linking or calls among application programs in the CICS environment.

In addition to the program name for the called application, the intercept program may also collect metrics related to the performance of called application programs. For example, the intercept program may determine the elapsed execution time for a called application. In another example, the intercept program may determine accumulated CPU time for a called application. To do so, the intercept program saves off the current time at which the calling application linked to the called application as well as saves the accumulated CPU time for the task up to that point. In an example embodiment, the accumulated CPU time can be retrieved from an operating system routine call. At 54 an intercept program stores the collected linking information in a work area for an intercept program and a previous active entry in the task's APLE, if one exists for the CICS task under which the call occurs. In other words, if present, a calling program's metrics are paused while the called program's metrics are being started. The called program's metrics can then be determined when control is returned to the intercept program after execution of the called application. These are merely examples of the types of performance metrics that can be captured by the intercept program.

The intercept program saves address of the calling domain at 55. In some embodiments, the current stack entry is updated with the address of the domain address of the calling application. To do so, the intercept program saves its current domain address in the intercept program's kernel stack (work) area, retrieves the caller's domain address from a caller's kernel stack entry, and updates the intercept program's current stack entry domain address with an address of the caller's domain address. This makes the user domain gate program appear to the intercepted gate program as though it were a domain gate program originating from the domain from where the call originated.

Lastly, the intercepted domain gate program is called at 56 through kernel linkage routines by the intercept program using the previously unused domain gate number. In the example of FIG. 5, the call is made to the intercepted DFHAPLI1 program with its parameter list unchanged. It is to be understood that only the relevant steps of the intercept program are discussed in relation to FIG. 5, but that other steps and/or functions may be implemented by an intercept program.

FIG. 6 provides an overview of the functionality implemented by an intercept program upon exiting the domain gate hosting the intercept program, for example upon exit from the DFHAPLI domain gate. As a starting point, the exit procedure for the intercept program restores its domain address to its stack entry. That is, it sets the address of the DFHAP domain back in its stack entry from that of the caller's domain at 61.

Like entry processing, the exit procedure of the intercept program performs certain validations. For example, the intercept program checks the function set for the domain gate program as indicated at 62. Continuing with the example of the DFHAPLI gate, the intercept program confirms the function is set to APLI_START_PROGRAM. If so, processing continues; otherwise, the exit logic of the intercept program is bypassed. The intercept program also checks at 63 if the intercept program is enabled by the MNAS. If the intercept program is enabled, processing continues; otherwise, the exit logic of the intercept program is bypassed.

Next, the intercept program can calculate the elapsed time of execution for the called application as indicated at 64. To do so, the current time is determined by the intercept program and then a difference is calculated between the current time and the time at which the called application is linked to. This time is stored upon entry to the intercept program and is retrieved upon exit by the intercept program from its work area. In the case of multiple nested calls, it is readily understood that should any programs have been called by the called program, each called program's elapsed time will have been paused at entry by another instance of the intercept program on the task's kernel stack and calculated at exit of each called program's instance.

In a similar manner, the intercept program can calculate the accumulated CPU time for the called application as indicated at step 65. To do so, a second accumulated CPU time is retrieved from a system call and a difference is calculated by the intercept program between the second accumulated CPU time and the first accumulated CPU time, where the first accumulated CPU time was stored upon entry by the intercept program and can be retrieved upon exit by the intercept program from its work area. In the case of multiple nested calls, it is readily understood that should any programs have been called by the called program, each called program's CPU time will have been started at entry by another instance of the intercept program on the task's kernel stack and calculated at exit of each called program's instance.

Linking information and metrics calculated for the called program is then stored at 66 in a memory space accessible by tasks running in the address space of the online transaction processor 12. In the example embodiment, the linking information is stored in an entry of the APLE memory object, where the identifier for the CICS task serves as an index for the entry in the memory object. The linking information may include but is not limited to the program name of the called application, the elapsed time of execution for the called application, and the accumulated CPU time for the called application.

Lastly, the intercept program returns control at 67 to the domain gate program that called the domain gate hosting the intercept program. In some embodiments, the intercept program may increment a counter for the number of occurrences this program was linked to. It is to be understood that only the relevant steps of the intercept program are discussed in relation to FIG. 6, but that other steps and/or functions may be implemented by an intercept program.

Different domain gates necessitate different functionality for an intercept program replaced in a particular domain gate. Pseudocode for an intercept program corresponding to each of the four preferred domain gates is set forth in the appendix below. From these examples, it is readily understood how an intercept program can be tailor for a particular domain gate.

In this way, linking information for applications called during a CICS task are captured and stored, for example as entries in an APLE memory object. With reference to FIGS. 7A and 7B, the linking information saved in each task entry remains in the APLE memory object 71 until the task terminates. At that time, a user domain gate program at the DFHUSXM gate retrieves the linking information from the APLE memory object. Once the data from the APLE entry is retrieved, the APLE_APL_HDR data is cleared marking the entry as free or unused. The linking information is then sent by the user domain gate program to the address space assigned to a performance monitor 13 to be communicated to a server application for storage, retrieval, and display.

In some embodiments, a user domain gate program merges linking information with other information maintained by CICS monitoring. For example, linking information may be merged with task association data 74 and/or task monitor data 75. Task association data 74 includes but is not limited to a transaction identifier for a CICS task, task start time, terminal identifier, VTAM network identifier, VTAM application identifier, TCP network identifier, user identifier and the like. Task monitor data 75 includes but is not limited to task total CPU time, task elapsed time, task wait time, CPU time spent swapping TCBs, time spent running Java® virtual machines, time spent in resource managers, and other data, such as counters.

In an example embodiment, the linking information is provided to and reported by the performance monitor 13. To do so, a memory copy routine 76 copies the data from the CICS address space to data buffers 77 residing in the address space assigned to performance monitor 13. A report task 78 is configured to report data, for example to a TCP listener application 72 running in a z/OS address space. The TCP listener application 72 can in turn store the linking information in a database 73. In the example embodiment, the memory copy routine 76 and the report task 78 are implemented as part of the performance monitor 13. Other techniques for extracting the linking information from a CICS address space are also contemplated by this disclosure.

In a similar manner, a technique is presented for reporting dynamic calls made by COBOL programs running under an online transaction processor, such as CICS. Because CICS does not have visibility to the dynamic calls made by COBOL programs, the CPU time used by the called application programs and other performance metrics related to the execution of the called application programs cannot be reported by CICS monitoring. While reference is made to COBOL, it is readily understood that this technique can be extended to other programming languages as well.

FIG. 8 illustrates an example embodiment of the technique as it relates to dynamic call made by COBOL programs running under CICS. Again, CICS is defined by its assigned address space 21, including the programs and data residing therein. Library routines 81 are subroutines that handle functions such as dynamic calls made by COBOL application programs. An address table or library vector 82 stores pointers to various library routines 81. In the example embodiment, the library vector 82 is further defined as the IGZ LIBVEC table for COBOL. Other high-level languages such as PL/1 or C use different names that represent the same type of table or vector of routine addresses.

The performance monitor 13 is defined by an assigned performance monitor address space 26, including programs and data residing therein. Of note, the performance monitor address space 26 includes a first program 27, a second program 28 and an intercept program 29. The first program 27 and the second program 28 are running under a task executing in the performance monitor address space 26, i.e., an address space outside of the CICS address space 21. An intercept program 29 is configured to determine a program name for an application that is linked to by another application and to save the program name in a memory space accessible to tasks running in the CICS address space 21.

FIG. 9 depicts an example technique for reporting dynamic calls made by COBOL programs running under CICS in a mainframe computing environment. As a starting point, intercept program 29 is copied at 91 from performance monitor address space 26 into CICS address space 21 by first program 27.

COBOL uses different library routines 81 to handle dynamic calls made by COBOL application programs. Intercept programs are swapped in place of library routines 81. For example, for COBOL 4, an intercept program is swapped in for IGZCFCC library routine. As other examples, for COBOL 5 and COBOL 6, an intercept program is swapped in for IGZXFCAL, IGZXDCAL and IGZXDCSU library routines. Although these library routines are preferred, the intercept program may be swapped into other library routines in other embodiments.

A second program 28 identifies addresses for library routines 81, for example IGZXFCAL, as indicated at 92. In the example embodiment, a second program 28 is called by a first program 27, and the second program 28 passes addresses for the library routines back to the first program 27 using a control block allocated by the first program 27.

Next, first program 27 inserts at 93 the address for the library routine into a fixed location of an intercept program 29. In one example, the fixed location is between a standard language environment (LE) prefix of an intercept program (i.e., an LE compliant program) and executable code of the intercept program. When an intercept program calls library routines, the intercept program retrieves the address for the library routine from a fixed location. In this way, library routines remain in the execution of a language dynamic call sequence.

The first program 27 also locates an address for the library routine in library vector 82 and replaces the address for the library routine in the library vector 82 with the address of intercept program 29 as indicated at 94. When a dynamic call is made by a COBOL application, an applicable library routine is called, and an intercept program 29 is executed before execution of the applicable library routine. It is to be understood that only the relevant steps of the technique are discussed in relation to FIG. 9, but that other software-implemented instructions may be needed to control and manage the overall operation of a system.

FIG. 10 provides an overview of the functionality implemented by an intercept program 29 called when a dynamic call is made by a COBOL application program.

An intercept program 29 first determines at 101 linking information for the dynamic call made from the calling application to the called application. For example, intercept program 29 retrieves an identifier for a task associated with execution of a calling application and its CICS task number from a control block managed by an online transaction processor 12. In addition, intercept program 29 retrieves a program name for an application program being linked to or called by the calling application, for example from COBDSACB. In this way, intercept program 29 can report on dynamic calls made among COBOL application programs in the CICS address space 21.

Furthermore, intercept program 29 may also collect metrics related to performance of the called application. For example, intercept program 29 may determine elapsed execution time for a called application. In another example, intercept program 29 may determine accumulated CPU time for a called application. To do so, intercept program 29 saves off the current time at which a calling application links to a called application as well as saves off accumulated CPU time for a task. In an example embodiment, accumulated CPU time can be retrieved from a system call. These two metrics can then be determined when control is returned to intercept program 29 after execution of a called application. These are merely examples of the types of performance metrics that can be captured by intercept program 29.

Intercept program 29 saves linking information at 102 in a dynamic storage area (DSA) provided by LE to the intercept program 29, and the metrics of a previous active entry in a CICS's task's APLE, if one exists. In other words, if present, a calling program's metrics are paused while a called program's metrics are being started.

Lastly, at 104, intercept program 29 calls an associated library routine 81. Prior to doing so, intercept program 29 manipulates registers as indicated at 103. More specifically, intercept program 29 saves off its registers to the work area assigned to the intercept program and reloads the registers of the calling application. As a result, the associated library routine receives the registers of the calling COBOL application. In some embodiments, intercept program 29 may increment a counter for the number of calls to a program. It is to be understood that only the relevant steps of the intercept program 29 are discussed in relation to FIG. 10, but that other steps and/or functions may be implemented by an intercept program 29.

FIG. 11 provides an overview of the functionality implemented by an intercept program when execution of the called application program completes and control returns to the intercept program. As a starting point, the exit procedure for the intercept program restores its registers at 111.

Similar to entry processing, the exit procedure of an intercept program 29 checks at 112 if intercept program 29 is enabled. If intercept program 29 is enabled, processing continues; otherwise, the exit procedure of intercept program 29 is bypassed.

Next, intercept program 29 can calculate the elapsed time of execution for the called application as indicated at 113. To do so, the current time is determined by intercept program 29 and then a difference is calculated between the current time and the time at which the called application is linked to. This time is stored upon entry to intercept program 29 and is retrieved upon exit by intercept program 29 from its work area. In the case of multiple nested calls, it is readily understood that should any programs have been called by the called program, each called program's elapsed time will have been paused at entry by another instance of the intercept program on the task's kernel stack and calculated at exit of each called program's instance.

In a similar manner, intercept program 29 can calculate the accumulated CPU time for the called application as indicated at step 114. To do so, a second accumulated CPU time is retrieved from a system call and a difference is calculated by intercept program 29 between the second accumulated CPU time and the first accumulated CPU time, where the first accumulated CPU time was stored upon entry by intercept program 29 and can be retrieved upon exit by intercept program 29 from its work area. In the case of multiple nested calls, it is readily understood that should any programs have been called by the called program, each called program's CPU time will have been started at entry by another instance of the intercept program on the task's kernel stack and calculated at exit of each called program's instance.

Linking information and metrics calculated for the called program is then saved at 115 in a memory space accessible by tasks running in the address space of the online transaction processor 12. In the example embodiment, the linking information is stored in an entry of the APLE memory object, where the identifier for the CICS task serves as an index for the entry in the memory object. The linking information may include but is not limited to the program name of the called application, the elapsed time of execution for the called application, and the accumulated CPU time for the called application.

Lastly, intercept program 29 returns control at 116 to the calling program. It is to be understood that only the relevant steps of the intercept program are discussed in relation to FIG. 11, but that other steps and/or functions may be implemented by an intercept program.

Different COBOL dynamic call parameters will necessitate different functionality for an intercept program 29 swapped in place of an associated library routine 81. Pseudocode for an intercept program corresponding to each of the four preferred library routines associated with COBOL is set forth in the appendix below. From these examples, it is readily understood how an intercept program 29 can be tailored for a particular library routine 81.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying," or the like, refer to the action and processes of a computer system, or similar electronic computing device, that manipulates and transforms data represented as physical (electronic) quantities within computer system memories or registers or other such information storage, transmission, or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real-time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by a computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

DFHUSXM Gate

```
Function = USXM_INQUIRE_TRANSACTION_USER
   ENTRY
      Check function for USXM_INQUIRE_USER_TRANSACTION, bypass ENTRY logic if not.
      Check if exits disabled, bypass ENTRY logic if so.
      Set up or prime APLE entry corresponding to the CICS task.
      Baseline CPU time for subsequent programs.
      Baseline elapsed time for subsequent programs.
      Save current DFHUS domain then set domain to that of caller.
   Call relocated DFHUSXM gate using kernel linkage routines.
   EXIT
      Restore DFHUS domain.
      Return to calling domain via kernel linkage routines.
Function = USXM_END_TRANSACTION
   ENTRY
      Check function for USXM_END_TRANSACTION, bypass ENTRY logic if not.
      Locate task's APLE entry.
      Finalize/accumulate all program CPU times.
      Aggregate CICS association data, monitoring data, and program data.
      Send aggregated data to monitor address space.
      Save current DFHUS domain then set domain to that of caller.
   Call relocated DFHUSXM gate using kernel linkage routines.
   EXIT
      Restore DFHUS domain.
      Return to calling domain via kernel linkage routines.
```

DFHAPLI Gate

```
Function = APLI_START_PROGRAM
   ENTRY
      Check function for APLI_START_PROGRAM, bypass ENTRY logic if not.
      Check if exits disabled, bypass ENTRY logic if so.
      Saves current time of day (store clock) value.
      Saves command function (LINK/XCTL) or initial LINK from CICS.
      Locate task's APLE entry.
      Locate available program entry, if none updates lost count and go look for an
   active entry.
            - Save current CPU time with TIMEUSED values.
            - Set program's logical level.
            - Baseline program's elapsed time.
            - Increment active program count in task's APLE, set current program
   entry as active.
            - Set new program logical level in task's APLE.
         Look for any previous entry marked active, update its CPU/elapsed times and
         mark it idle.
         Save current DFHAP domain then set domain to that of caller.
      Call relocated DFHAPLI gate using kernel linkage routines.
   EXIT
         Restore DFHAP domain.
         Check function for APLI_START_PROGRAM, bypass ENTRY logic if not.
         Saves current time of day (store clock) value.
         If program tracking was lost due to no room, bypass EXIT processing.
            - Save current CPU time with TIMEUSED values.
```

-continued

- Finalize program CPU and elapsed times.
  - Decrement active program count in task's APLE.
  - Update logical level in task's APLE.
  - Look for any previous entry marked idle and mark it active, update
 active entry in APLE.
 Return to calling domain via kernel linkage routines.

DFHDSAT Gate

Function = DSAT_CHANGE_MODE | | DSAT_CHANGE_PRIORITY
 ENTRY
  Check function for DSAT_CHANGE_MODE | | DSAT_CHANGE_PRIORITY, bypass
ENTRY logic if not.
  Check if exits disabled, bypass ENTRY logic if so.
  Locate task's APLE entry.
  Check for active program entry, determine/save its address for EXIT processing.
  Save current DFHDS domain then set domain to that of caller.
 Call relocated DFHDSAT gate using kernel linkage routines.
 EXIT
  Restore DFHDS domain.
  Check function for DSAT_CHANGE_MODE | | DSAT_CHANGE_PRIORITY, bypass
EXIT logic if not.
  Check if exits disabled, bypass ENTRY logic if so.
  For DSAT_CHANGE_MODE only, check if the CICS task is running on the same
(K)TCB, skip further EXIT processing.
  If active program entry address found at ENTRY, updates current/active
program's CPU time, otherwise accumulate into general task times.
  Restarts current program's CPU and elapsed times corresponding to the new
 (K)TCB.
  Return to calling domain via kernel linkage routines.

DFHDSSR Gate

Function = DSSR_SUSPEND
 ENTRY
  Check function for DSSR_SUSPEND, bypass ENTRY logic if not.
  Check if exits disabled, bypass ENTRY logic if so.
  Locate task's APLE entry.
  Check for active program entry, determine/save its address for EXIT processing.
  Saves current time of day (store clock) value.
  Save current DFHDS domain then set domain to that of caller.
 Call relocated DFHDSSR gate using kernel linkage routines.
 EXIT
  Restore DFHDS domain.
  Check function for DSSR_SUSPEND, bypass EXIT logic if not.
  Check if exits disabled, bypass ENTRY logic if so.
  Saves current time of day (store clock) value.
  If active program entry address found at ENTRY, updates current/active
program's CPU time, otherwise accumulate into general task times.
  Calculate time of day delta and update program's suspend time.
  Restarts current program's CPU time corresponding to the new (K)TCB.
  Return to calling domain via kernel linkage routines.

IGZXFCAL

Entering
 Locate called program name from COBDSACB, set 'NOT FOUND' if unavailable.
 Locate task's current CICS kernel stack entry.
 Locate the GXWA.
 Check if exits disabled, bypass entry logic if so.
 Saves current time of day (store clock) value.
 Saves command function as dynamic call.
 Locate task's APLE entry.
 Locate available program entry, if none update lost count and go look for an
active entry.
  - Save current CPU time with TIMEUSED values.
  - Baseline program's elapsed time.
  - Increment active program count in task's APLE, set current program
entry as active.
  - Set new program logical level from that previously saved in APLE entry.

-continued

Look for any previous entry marked active, update its CPU/elapsed times and
　　　　mark it idle.
　　Save STRBGZxx registers, reload caller's registers and call IGZXFCAL directly.
　　Exiting
　　　　Saves current time of day (store clock) value.
　　　　If program tracking was lost due to no room, bypass exiting process.
　　　　　　- Save current CPU time with TIMEUSED values.
　　　　　　- Finalize program CPU and elapsed times.
　　　　　　- Decrement active program count in task's APLE.
　　　　　　- Look for any previous entry marked idle and mark it active, update
　　　　active entry in APLE.
　　　　Return to caller, COBOL program that did the CALL.

IGZXDCSU

Entering
　　　　Locate called program name from caller's R1 parameter list, set 'NOT FOUND' if
unavailable.
　　　　Locate task's current CICS kernel stack entry.
　　　　Locate the GXWA.
　　　　Check if exits disabled, bypass entry logic if so.
　　　　Saves current time of day (store clock) value.
　　　　Saves command function as dynamic call.
　　　　Locate task's APLE entry.
　　　　Saved called program name in APLE entry for IGZXDCAL processing.
　　Save STRBGZxx registers, reload caller's registers and call IGZXDCSU directly.
　　Exiting
　　　　Return to caller, COBOL program that did the CALL.

IGZXDCAL

Entering
　　　　Default called program name to 'NOT FOUND'
　　　　Locate task's current CICS kernel stack entry.
　　　　Locate the GXWA.
　　　　Check if exits disabled, bypass entry logic if so.
　　　　Saves current time of day (store clock) value.
　　　　Saves command function as dynamic call.
　　　　Locate task's APLE entry.
　　　　Retrieve called program name from task's APLE, clear it from APLE.
　　　　　　- Save current CPU time with TIMEUSED values.
　　　　　　- Baseline program's elapsed time.
　　　　　　- Increment active program count in task's APLE, set current program
entry as active.
　　　　　　- Set new program logical level from that previously saved in APLE entry.
　　　　Look for any previous entry marked active, update its CPU/elapsed times and
　　　　mark it idle.
　　Save STRBGZxx registers, reload caller's registers and call IGZXDCAL directly.
　　Exiting
　　　　Saves current time of day (store clock) value.
　　　　If program tracking was lost due to no room, bypass exiting process.
　　　　　　- Save current CPU time with TIMEUSED values.
　　　　　　- Finalize program CPU and elapsed times.
　　　　　　- Decrement active program count in task's APLE.
　　　　　　- Look for any previous entry marked idle and mark it active, update
　　　　active entry in APLE.
　　　　Return to caller, COBOL program that did the CALL.

IGZCFCC

Entering
　　　　Locate called program name from caller's R1 parameter list, set 'NOT FOUND' if
unavailable.
　　　　Locate task's current CICS kernel stack entry.
　　　　Locate the GXWA.
　　　　Check if exits disabled, bypass entry logic if so.
　　　　Saves current time of day (store clock) value.
　　　　Saves command function as dynamic call.
　　　　Locate task's APLE entry.

```
    Locate available program entry, if none update lost count and go look for an
active entry.
        - Save current CPU time with TIMEUSED values.
        - Baseline program's elapsed time.
        - Increment active program count in task's APLE, set current program
entry as active.
        - Set new program logical level from that previously saved in APLE entry.
        Look for any previous entry marked active, update its CPU/elapsed times and
        mark it idle.
    Save STRBGYxx registers, reload caller's registers and call IGZCFCC directly.
    Exiting
        Saves current time of day (store clock) value.
        If program tracking was lost due to no room, bypass exiting process.
            - Save current CPU time with TIMEUSED values.
            - Finalize program CPU and elapsed times.
            - Decrement active program count in task's APLE.
            - Look for any previous entry marked idle and mark it active, update
            active entry in APLE.
    Return to caller, COBOL program that did the CALL.
```

What is claimed is:

1. A computer-implemented method for reporting application programs linked to by an application running under an online transaction processor of a mainframe computing environment, comprising:

providing an intercept program in an address space of the on line transaction processor;

determining, using the intercept program, a program name for an application program linked to by the application;

storing, using the intercept program, the program name in a memory space accessible by tasks running in the address space of the online transaction processor;

identifying, using a task executing outside of the address space for the online transaction processor, an address for a target domain gate program supported in a domain of the online transaction processor;

identifying, using the task, an address for an unused domain gate program supported in the domain of the online transaction processor;

replacing, using the task, the address for the unused domain gate program with the address for the target domain gate program; and replacing, using the task, the address for the target domain gate program with an address for the intercept program.

2. The method of claim 1 further comprises copying the intercept program into the address space of the online transaction processor by a performance monitor, where the task is executing in an address space assigned to the performance monitor.

3. The method of claim 1 wherein the target domain gate program includes a function that passes control to another application.

4. The method of claim 1 further comprises executing the intercept program during processing of the application by the online transaction processor.

5. The method of claim 4 further comprises the intercept program:

retrieving an identifier for an application task associated with execution of the application from a control block managed by the online transaction processor;

determining current time for linking to the application program;

determining a first accumulated central processing unit (CPU) time for the application task from a system call; and storing in a work area for the intercept program the program name, along with the current time for linking to the application program, and the accumulated CPU time for the application task; and calling the target domain gate program.

6. The method of claim 5 further comprises executing the intercept program upon receiving control back from the target domain gate program.

7. The method of claim 6 further comprises the intercept program:

determining a current time;

calculating a difference between the current time and the current time for linking to the application program; and using the identifier for the application task as an index, storing the program name, along with the difference, in the memory space.

8. The method of claim 6 further comprises the intercept program:

determining from a system call a second accumulated CPU time for the application task;

calculating a difference between the second accumulated CPU time and the first accumulated CPU time; and using the identifier for the application task as an index, storing the program name, along with the difference, in the memory space.

9. A computer-implemented method for reporting application programs linked to by an application running under an online transaction processor of a mainframe computing environment, wherein the application is written in accordance with a given programming language, comprising:

providing an intercept program in an address space of the on line transaction processor;

determining, using the intercept program, a program name for an application program linked to by the application;

storing, using the intercept program, the program name in a memory space accessible by tasks running in the address space of the online transaction processor;

identifying, using a task executing outside of the address space of the online transaction processor, an address for a target library routine in an address table, where the target library routine is associated with the given programming language;

inserting, using the task, the address for the target library routine into the intercept program; and replacing, using the task, the address for the target library routine in the address table with an address for the intercept program.

10. The method of claim 9 further comprises copying the intercept program into the address space of the online transaction processor by a performance monitor, where the task is executing in an address space assigned to the performance monitor.

11. The method of claim 9 further comprises identifying the address for the target library routine using an address table of pointers for subroutines associated with the given programming language.

12. The method of claim 9 wherein the given programming language is further defined as common business-oriented language (COBOL).

13. The method of claim 9 further comprises executing the intercept program during processing of the application by the online transaction processor.

14. The method of claim 13 further comprises the intercept program:
retrieving an identifier for an application task associated with execution of the application from a control block managed by the online transaction processor;
determining current time for linking to the application program;
determining a first accumulated central processing unit (CPU) time for the application task from a system call;
storing in a work area for the intercept program the program name, along with the current time for linking to the application program, and the accumulated CPU time for the application task; and
calling the target library routine.

15. The method of claim 13 further comprises executing the intercept program in response to a target domain gate program receiving control back from the target library routine.

16. The method of claim 15 further comprises the intercept program:
determining current time;
calculating a difference between the current time and the current time for linking to the application program; and
using the identifier for the task as an index, storing the program name, along with the difference, in the memory space.

17. The method of claim 15 further comprises the intercept program:
determining from a system call a second accumulated CPU time for the task;
calculating a difference between the second accumulated CPU time and a first accumulated CPU time; and
using the identifier for the application task as an index, storing the program name, along with the difference, in the memory space.

18. A computer-implemented system for reporting application programs linked to by an application running under an online transaction processor of a mainframe computing environment, comprising at least one processor and at least one memory storing instructions that are executable by the at least one processor, the instructions including:
an intercept program residing in an address space of the online transaction processor;
a domain table residing in the address space of the online transaction processor and storing addresses for domain gate programs supported in a domain of the online transaction processor; and
a performance monitor residing outside of the address space of the online transaction processor and configured, when executed by the at least one processor, to identify an address for a target domain gate program and an address for an unused domain gate program using the domain table,
wherein the performance monitor, when executed by the at least one processor, operates to replace the address for the unused domain gate program with the address for the target domain gate program and to replace the address of the target domain gate program with an address for the intercept program.

19. The computer-implemented system of claim 18 wherein, upon execution by the at least one processor, the intercept program determines a program name for an application program linked to by the application and stores the program name in a memory space accessible by tasks running in the address space of the online transaction processor.

20. The computer-implemented system of claim 18 further includes a memory copy routine residing in the address space of the online transaction processor which, when executed by the at least one processor, operates to copy a program name for the application program linked to by the application from the memory space accessible by tasks running in the address space of the on line transaction processor to a memory space assigned to the performance monitor.

* * * * *